April 1, 1958 — M. STEIN — 2,829,339
TESTING DEVICE FOR ELECTRICAL CIRCUITS
Filed Aug. 12, 1955
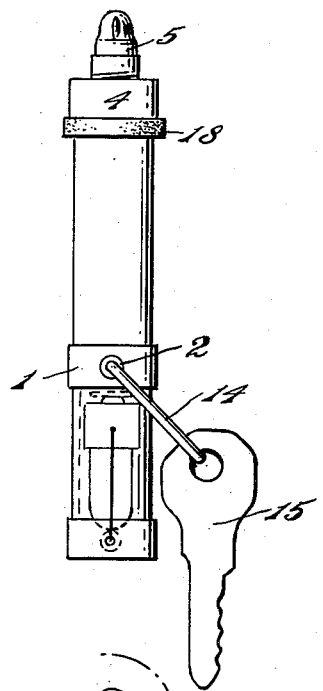
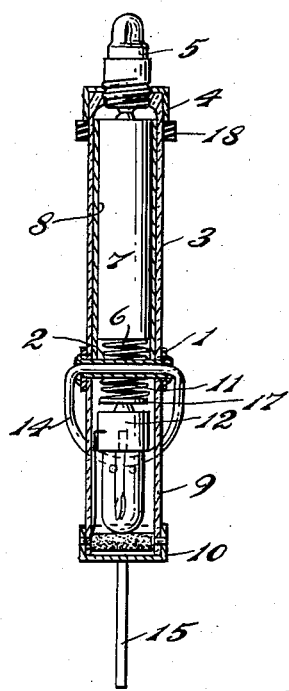
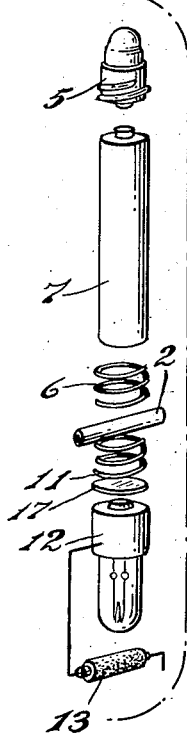
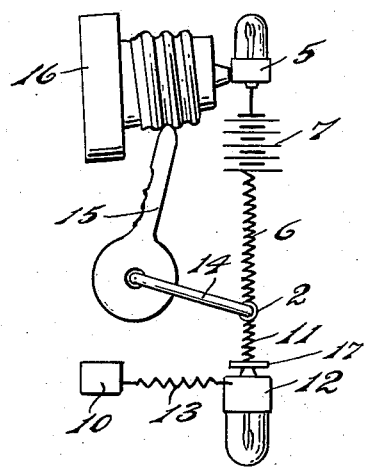
INVENTOR
*Morris Stein*
BY
*Herbert H. Fairbanks*
ATTORNEY.

United States Patent Office 2,829,339
Patented Apr. 1, 1958

2,829,339

TESTING DEVICE FOR ELECTRICAL CIRCUITS

Morris Stein, Philadelphia, Pa.

Application August 12, 1955, Serial No. 527,906

2 Claims. (Cl. 324—53)

The object of this invention is to devise a novel testing device for electrical circuits capable of testing 110 A. C. or 220 A. C.

A further object is to devise a tester of the character described which can be carried in the pocket of the user and which is of special value to a motorist since it acts as a search light or a testing device.

A further object of the invention is to combine the testing device with a key ring as a component thereof, and to use a key on the ring as a contact member for testing a large number of different articles, for example spark plugs, fuse plugs, lighting circuits etc.

With the foregoing and other objects in view as will hereinafter clearly appear, my invention comprehends a novel testing device for electrical circuits.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized, and the invention is not limited, except by the scope of the appended claims to the exact arrangement and organization of these instrumentalities as herein set forth.

Figure 1 is a side elevation of a testing device for electrical circuits, embodying my invention.

Figure 2 is a longitudinal section.

Figure 3 is an exploded view of component parts.

Figure 4 is a wiring diagram showing a manner of using the device for testing a fuse plug.

Similar numerals of reference indicate corresponding parts.

Referring to the drawings:

The testing device has intermediate its ends a metallic ring 1 with a metallic tube 2 extending transversely through it and connected with it in any conventional manner, for example by soldering or welding.

A cylinder 3 of insulating material has its inner end fixed in the ring and its outer end is provided with a metallic cap 4 internally threaded to receive a light bulb 5 of one volt capacity. A spring 6 between the tube 2 and the battery 7 retains the battery in contact with the light bulb 5 and contributes to form a series circuit. An inner cylinder 8 of insulating material is within the cylinder 3, and both cylinders are preferably transparent and slightly spaced from each other to receive advertising material or such material can be impressed on either cylinder.

A transparent cylinder 9, preferably of insulating material has one end fixed in the ring 1 and its other end in a metallic cap 10. A spring 11 contacts the tube 2 and a metallic disc 17 which latter contacts a sixty volt bulb 12. The bulb 12 is connected by a 750,000 resistor 13 with the metallic cap 10. One end of the resistor is electrically connected to the shell of the bulb and the other end of the resistor is electrically connected to the metallic cap 10. Such connections are made by soldering, welding or any other well known method of connecting parts in an electrical circuit. The bulb 12 is a standard neon bulb. A key ring 14 has its inturned free ends received in the tube 2 and a key 15 on the ring serves as a contact member, for example to close the circuit through a fuse plug 16 and the light bulb 5.

In order to prevent accidental closing of the circuit through light bulb 5 an insulating ring 18 may be provided.

If one desires to use the tester as a flash light the key 15 is moved into contact with the cap 4, thus closing the series circuit through ring 1, tube 2, spring 6, battery 7 and light bulb, as is evident. The key ring may be detached, and the circuit closed by means of a conducting wire having one end contacting the ring 1 and the other end contacting the light bulb 5 or cap 4.

If a 220 volt circuit is to be tested, the operator holds the tester contacting the ring 1 and touches the cap 10 to the object to be tested and if the circuit is closed the bulb lights up, the tester being grounded through the body of the operator. It will thus be apparent that 110 volt circuits as well as 220 volt circuits can be tested.

My present testing device is of special advantage to a motorist since he can combine with a tester the ignition key of his automobile in one structure which is always accessible for use as may be needed.

The arrangement is such that a series circuit is provided for both 110 volts or 220 volts.

The key ring is readily removable as is apparent, and if desired the key ring may be removed and the circuit between the end cap and light bulb and the ring closed by a short piece of conducting wire, such wire being also used for testing electrical devices or articles if desired.

Having thus described my invention, what I claim as new and desire to secure by Letters Patent is:

1. A testing device for electrical circuits, comprising a centrally located metallic ring, a metallic tube passing transversely through and connected with said ring, a cylinder of insulating material fixed in one end of said ring, a metallic cap secured to the outer end of said cylinder, a light bulb connected with said cap, a spring pressed battery in said cylinder and in series with said ring tube and bulb, a transparent second cylinder having its inner end fixed in said ring and in longitudinal alignment with said first cylinder, a metallic cap fixed to the outer end of the second cylinder, a sixty volt bulb in the outer end of the second cylinder, a 750,000 resistor in series with the bulb in the second cylinder and with said second cap and the tube, and a testing prod movably carried by said tube, whereby when the user grasps said ring and contacts said first cap with said prod the circuit is closed through the first bulb, and when the user grasping the ring contacts the article to be tested with the second cap the circuit is closed through the sixty volt bulb and grounded through the user.

2. The combination claimed in claim 1, wherein the testing prod is in the form of a key, and a key ring carries the key and is swivelled in the ends of the tube.

References Cited in the file of this patent

UNITED STATES PATENTS

| | | |
|---|---|---|
| 1,639,889 | Humm | Aug. 23, 1927 |
| 2,616,952 | Lauder | Nov. 4, 1952 |